G. H. BUDD.
TIRE CASING SEAL.
APPLICATION FILED MAY 23, 1918. RENEWED DEC. 13, 1919.
1,347,439.
Patented July 20, 1920.
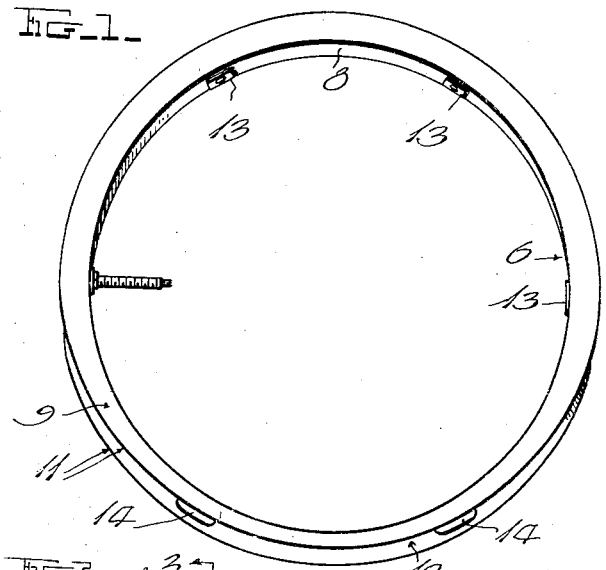
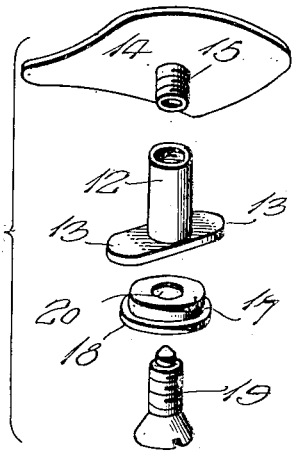
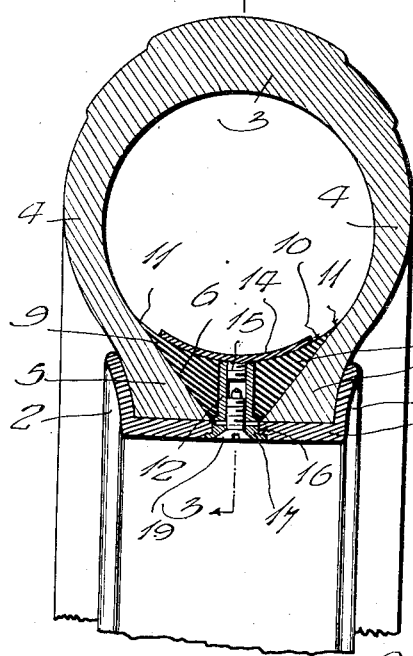
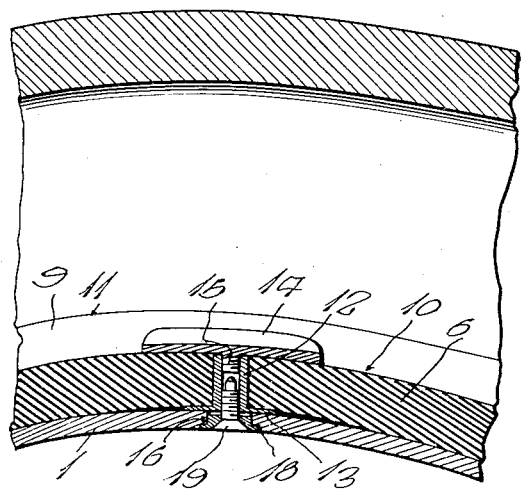
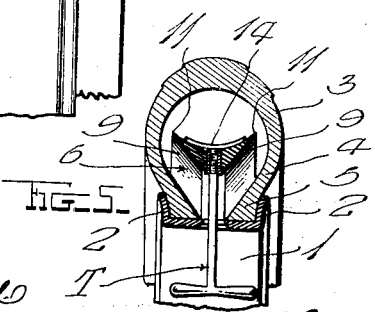
Witness
H. Woodard
Inventor
G. H. Budd
By H. B. Willson & Co.
Attorneys

UNITED STATES PATENT OFFICE.

GEORGE H. BUDD, OF SALT LAKE CITY, UTAH.

TIRE-CASING SEAL.

1,347,439.  Specification of Letters Patent.  Patented July 20, 1920.

Application filed May 23, 1918, Serial No. 236,150. Renewed December 13, 1919. Serial No. 344,760.

*To all whom it may concern:*

Be it known that I, GEORGE H. BUDD, a citizen of Canada, residing at Salt Lake City, in the county of Salt Lake and State of Utah, have invented certain new and useful Improvements in Tire-Casing Seals; and I do declare the following to be a full, clear, and exact description of the invention, such as will enable others skilled in the art to which it appertains to make and use the same.

My invention has for its object to provide simple and inexpensive, yet highly efficient and durable means for sealing the usual automobile and motorcycle tire casings against the escape of air, thus making it possible to inflate the casing without an inner tube and its consequent expense and disadvantages, the arrangement being such as to require no alterations in the casing and only the formation of several openings in the rim.

With the foregoing general object in view, the invention resides in the novel features of construction and unique combinations of parts to be hereinafter fully described and claimed, the descriptive matter being supplemented by the accompanying drawing which forms a part of this application and in which:

Figure 1 is a perspective view of the casing seal;

Fig. 2 is a transverse section of a tire casing embodying the seal and showing the method of securing the latter to the rim;

Fig. 3 is a sectional view on the plane indicated by the line 3—3 of Fig. 2;

Fig. 4 is a disassembled perspective view of the means employed for attaching the seal to the rim; and Fig. 5 is a view similar to Fig. 2 illustrating the manner in which the seal may be forced away from the casing and rim when removing or applying the former.

In the drawing above briefly described, the numeral 1 designates a common form of automobile wheel rim having the usual or any preferred type of side flanges 2. A tire casing 3 of well known construction is mounted on the rim 1, the side walls 4 of said casing being provided with the usual beads 5 which snugly surround the rim 1 and abut the flanges 2. Heretofore, it has been the common practice to employ an air tight inner tube within the casing and to inflate this tube, but this arrangement has several disadvantages, such as the expense of the tube, and its inaccessibility for purposes of repair. The present invention therefore has been devised to overcome the necessity of using an inner tube in the casing, and to this end, the arrangement now to be described is provided.

A one piece sealing ring 6 of soft rubber is located between the beads 5, said ring being sufficiently elastic to permit the same to be stretched over the side flange 2 of the rim 1 when either applying or removing the casing, as will be clear for instance from Fig. 5 in which a tool T is shown for the purpose of disengaging the ring 6 from the beads and rim. Under normal circumstances, the elasticity of the ring 6 serves to retain it tightly in contact with the casing and rim in an air tight manner so that when the casing is inflated through a valve stem 7 carried by the ring 6, no air will escape around the edges of the latter. In fact, these edges will in most cases be suitably cemented or gummed to the inner faces of the beads 5 and the adjacent portions of the side walls 4.

Ring 6 is provided with a relatively narrow rim engaging side 8, with a pair of outwardly diverging edges 9; and with a peripheral side 10 curved transversely on substantially the same curvature as the transverse contour of the casing 3. The edges 9 and the peripheral side 10 converge slowly outward and form a pair of thin feather-edged flaps 11 which contact against the inner faces of the side walls 4 and are freely yieldable with the latter.

I provide novel means for anchoring the sealing ring 6 to the rim 1, at the same time making suitable provision for forcing the ring away from the beads of the casing when necessary, as shown in Fig. 5. To this end, a plurality of circumferentially spaced metal sleeves 12 are embedded in the ring 6 and extend from the inner side 8 thereof to the outer side 10, the inner ends of said sleeves being provided with lateral wings or lugs 13 which are embedded in the inner side 8 of the ring 6 to prevent rotation of said sleeves. Circumferentially spaced plates 14 rest on and are shaped correspondingly to the peripheral side 10 of the ring 6 and are provided at their centers with studs 15 which are threaded into the outer ends of the sleeves 12. At the inner ends of the sleeves 12, the rim 1 is provided with counter-bored openings 16 in which plugs 17 are normally received, said plugs having annular flanges 18 positioned in the counterbores of the openings. Screws 19 are passed through central openings 20 in the plugs 17 and are counter-sunk in the latter, said screws being threaded in the inner ends of the sleeves 12, whereby the latter and the entire ring 6 are effectively yet detachably secured to the rim. By removing the screws 19, the plugs 17 may be withdrawn from the openings 16, thus permitting the shank of the tool T (Fig. 5) to be passed outwardly through first one opening and then another for the purpose of disengaging the ring 6 from the casing, thus permitting easy removal of the outer casing bead from the rim. This operation is also performed when inserting the outer bead between the ring 6 and the outer rim flange 2. As shown, the inner end of the tool shank is preferably threaded for engagement with the inner ends of the sleeves 12.

From the foregoing, taken in connection with the accompanying drawing, it will be obvious that although I have provided a comparatively simple and inexpensive seal for tire casings, the same will be highly efficient and desirable. Since probably the best results are obtained from the details shown and described, they are preferably followed, but within the scope of the invention as claimed, numerous minor changes may well be made.

I claim:—

1. In combination with a channeled wheel rim, a tire casing on said rim, and means for inflating said casing; an air seal for said casing comprising a one piece elastic ring of soft rubber located between the beads of the casing and of sufficient elasticity to stretch over the rim flange when applying and removing, said ring having a relatively narrow rim engaging side, a pair of opposed edges diverging outwardly from said rim engaging side, and a peripheral side curved transversely on substantially the same curvature as the cross sectional contour of the casing, said edges and said peripheral side converging gradually outward and forming thin feather-edged flaps contacting snugly with the side walls of the casing and yieldable freely therewith.

2. In combination with a channeled wheel rim, a tire casing on said rim, and means for inflating said casing; an air seal for said casing comprising a one piece elastic ring of soft rubber located between the beads of the casing and of sufficient elasticity to stretch over the rim flange when applying and removing, said ring having a relatively narrow rim engaging side, a pair of opposed edges diverging outwardly from said rim engaging side, and a peripheral side curved transversely on substantially the same curvature as the cross sectional contour of the casing, said edges and said peripheral side converging gradually outward and forming thin feather-edged flaps contacting snugly with the side walls of the casing and yieldable freely therewith, a plurality of radial sleeves embedded in said ring and extending from said rim engaging side to said peripheral side thereof, the inner ends of said sleeves having lateral wings engaging the former, circumferentially spaced plates contacting with the peripheral side of the ring and curved to correspond thereto, integral central studs on said plates threaded in the outer ends of said sleeves, the rim having counter-bored openings at the inner ends of said sleeves, plugs received removably in said openings and having flanges located in the counter-bores thereof, and screws passing outwardly through said plugs and threaded in said sleeves, removal of said screws and plugs permitting the passage of a tool through said openings for the purpose of disengaging the ring from the casing.

In testimony whereof I have hereunto set my hand.

GEORGE H. BUDD.

Witnesses:
 JOSEPH DEBARTHE,
 E. B. DRIELSMA.